March 12, 1946.  R. STANSFIELD  2,396,540
MEANS FOR DETECTING AND MEASURING TORSIONAL VIBRATIONS
Filed Jan. 21, 1943  2 Sheets-Sheet 1

INVENTOR
R. Stansfield
BY James N. Curtin
ATTORNEY

March 12, 1946.   R. STANSFIELD   2,396,540
MEANS FOR DETECTING AND MEASURING TORSIONAL VIBRATIONS
Filed Jan. 21, 1943   2 Sheets-Sheet 2
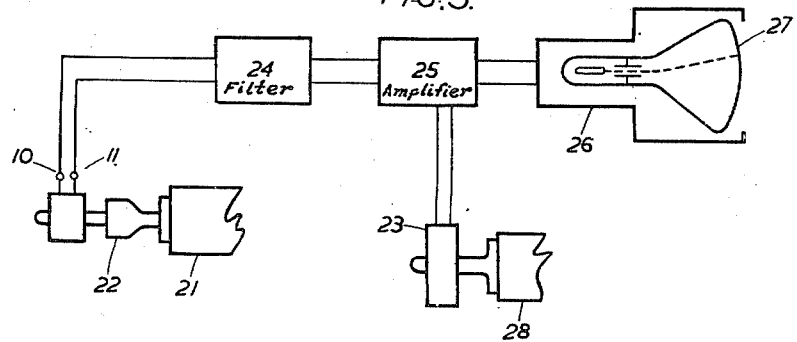
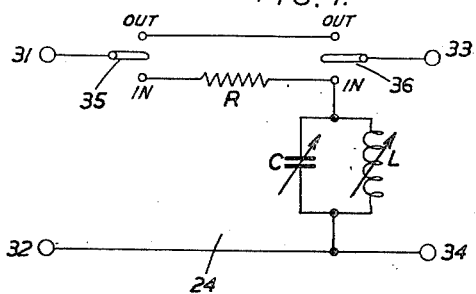
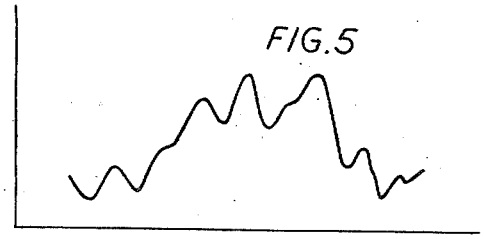
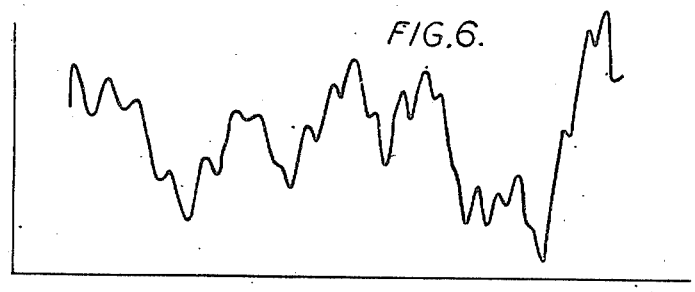
INVENTOR
R. Stansfield
BY James N. Curtin
ATTORNEY Patented Mar. 12, 1946

2,396,540

UNITED STATES PATENT OFFICE 2,396,540

MEANS FOR DETECTING AND MEASURING TORSIONAL VIBRATIONS

Richard Stansfield, Teddington, England, assignor, by mesne assignments, to International Standard Electric Corporation, New York, N. Y., a corporation of Delaware Application January 21, 1943, Serial No. 473,084
In Great Britain March 10, 1942

12 Claims. (Cl. 73—68)

The present invention relates to electro-mechanical arrangements for detecting and observing torsional vibrations, and is of special application to the vibratory effects which occur in driving shafts used for transmitting mechanical power in machines.

For many years breakages have constantly occurred in rotating driving shafts used in various types of machinery, the reasons for which have not been clearly understood. While many of such breakages have been rightly attributed to vibrational resonance effects in the shaft excited by the driving means, very little was known about these effects and no entirely satisfactory methods existed for investigating them.

A very large class of mechanical systems subject to this trouble comprises those in which electric generators are driven through shafts from internal combustion engines, and the difficulties have been aggravated in recent years owing to a continual tendency for increase in the rotating speed and in the number of engine cylinders. As is well known, this type of engine is particularly liable to excite torsional vibration in the driving shaft owing to the discontinuous and periodic manner in which it supplies the power. The shaft, together with the rotating masses mounted on it constitute a mechanical oscillating system, the vibrating characteristics of which depend on the elasticity of the shaft and the inertia and distribution of the masses; and accordingly some apparently unimportant change, for instance a small change in speed, may bring some shaft resonance frequency into agreement with some frequency generated by the engine, resulting in excessive torsional vibrations possibly ending in breakage. These effects are very complicated and it is essential that convenient apparatus should be available to investigate shaft vibrations so that the sources of trouble may be definitely located and the proper remedies found.

The present invention provides accurate and convenient electrical means for observing and analyzing torsional vibrations in shafts or other rotating members. While various electrical and other methods have hitherto been tried, they have mostly proved incapable of registering with sufficient accuracy the higher vibrational frequencies which commonly occur with modern high speed engines. Some arrangements have proved very inaccurate in some parts of the frequency range because of the introduction of spurious resonances which may mask altogether the effects which are being investigated. In some cases also, the apparatus for the tests is so cumbersome that it is difficult to use in the neighbourhood of the machinery concerned.

According to the invention, there is provided apparatus for detecting torsional vibrations of a rotating member comprising an electro-mechanical generator so coupled to the said member that torsional vibrations cause it to generate electromotive forces, and means for detecting the said forces. There may be further provided means for preventing the steady rotation of the member for prolucing any electromotive force.

According to another aspect, the invention comprises apparatus for detecting torsional vibrations of a rotating member comprising an electro-mechanical generator having a shaft adapted to be coupled to the member, a mass driven by and freely rotatable through a small angle about the shaft, means associated with the mass and the shaft for causing alternating electromotive forces to be generated corresponding to angular vibrations of the mass relative to the shaft, and means for detecting the electromotive forces.

According to a further aspect the invention resides in apparatus for detecting torsional vibrations of a rotating member comprising an electromechanical generator adapted to be coupled to the test shaft, and having a cylindrical mass freely rotatable through a small angle about a shaft and driven thereby, means for creating a magnetic field linking a coil and for varying the linkage in accordance with the relative angular oscillations of the mass and shaft for generating in the coil electromotive forces corresponding to the oscillations, viscous means for damping the osillations, and means for detecting the electromotive forces.

According to still another aspect, there is provided apparatus for detecting torsional vibrations of a rotating member comprising an electro-mechanical generator adapted to be coupled to the member and having a hollow cylindrical mass with a coaxial shaft which passes through and drives the mass, and is freely rotatable through a small angle in plain bearings therein, viscous material for damping the relative movements of the shaft and mass, and means for producing a transverse magnetic field fixed relatively to the mass and linking a coil fixed to the shaft in such manner that angular vibrations of the shaft relative to the mass generate in the coil corresponding electromotive forces; and further comprising means for detecting the electromotive forces.

The invention will be described in detail below with reference to the accompanying drawings in which.

Figure 1:
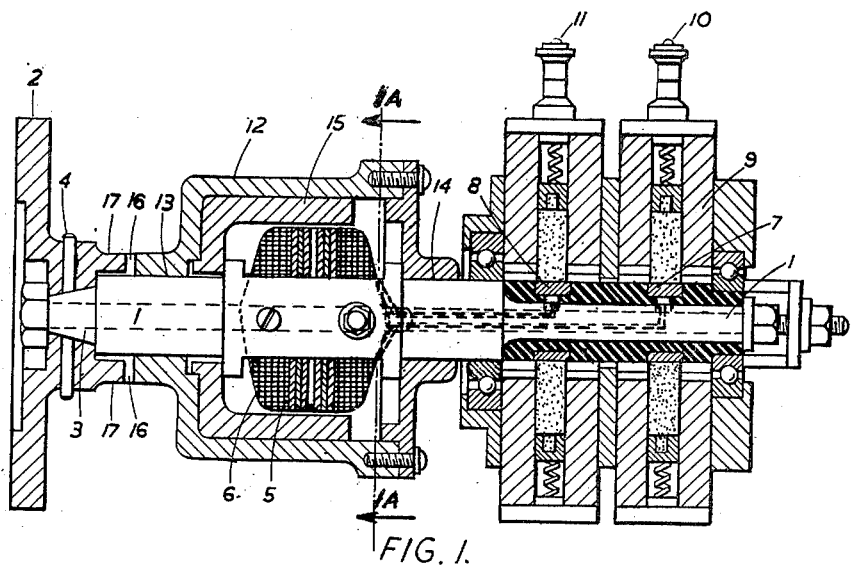
Fig. 1 represents an axial section through an electro-mechanical generator employed as part of the apparatus according to the invention.
Figures 1A, 2:
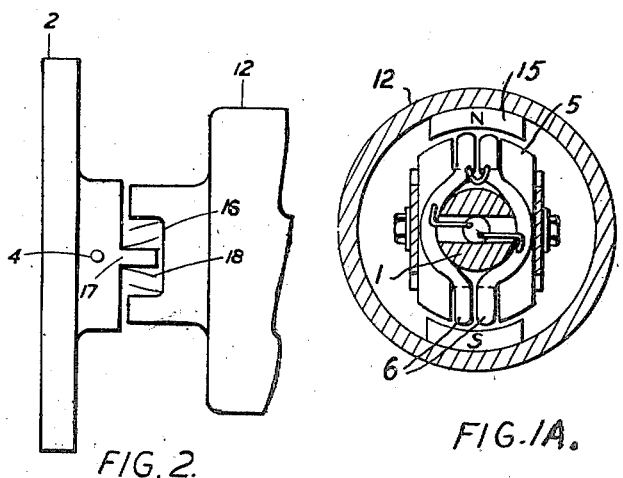
Fig. 1A is a cross sectional view taken on line 1A—1A of Fig. 1.

Fig. 2 gives a fragmentary view of Fig. 1 to show a detail;

Fig. 3 shows a block schematic circuit diagram of an arrangement of apparatus according to the invention for recording torsional vibrations in a rotating member or shaft;

Fig. 4 shows a schematic circuit diagram of one of the parts of Fig. 3; and

Figs. 5 and 6 show examples of curves taken with the apparatus of Fig. 3.

Before explaining the invention in detail, a general outline of the arrangement will be given.

An electro-mechanical-generator is rigidly coupled to the end of the rotating shaft. This generator will be called a torsional vibration pick-up unit, or shortly, a TV unit, and is an electromagnetic device. The torsional vibrations are made to oscillate a wound armature in a magnetic field produced by a magnet attached to a mass of relatively high polar moment of inertia floating between limit stops on the shaft carrying the armature which is driven from the source of the vibration. The magnet accordingly rotates at substantially constant speed.

The armature generates in the coil an electromotive force proportional to the angular velocity of the torsional vibrations, and this velocity is measured by applying the output from the armature coil to any suitable recording arrangement, which in the particular embodiment to be described, consists of an amplifier leading to a cathode ray oscillograph. The amplifier may be provided with an integrating circuit for use when it is desired to record angular deviations instead of angular velocities. An adjustable selective filter may also be used for analysing the records, by means of which the various components of a complicated record may be separately isolated for observation and measurement.

Electromagnetic TV units previously used have generally suffered from the serious defect that spurious resonances are introduced by the springs through which an inertia mass is driven. In the apparatus of the present invention, the mass ceases to be positively driven from the shaft after it has run up to speed and its speed is thereafter maintained substantially constant in virtue of its polar moment of inertia.

The whole of the apparatus for recording the torsional vibrations according to the invention may be made up in compact and easily portable form which allows it to be operated close to the machine to be tested.

Fig. 1 shows an axial section of the TV unit according to the invention. It comprises a short and very stiff shaft 1 rigidly fixed to a coupling plate 2 by means of a conical union 3 and a pin 4. The shaft carries a laminated armature 5 wound with a coil 6 having its axis at right angles to the shaft. Two insulated slip rings 7 and 8 are also mounted on the shaft and make contact with brush gear 9 running on ball bearings carried by the shaft. The coil 6 is connected to the slip rings 7 and 8 by wires running through the centre of the shaft and thence through the brushes to the external terminals 10 and 11.

A hollow relatively heavy non-magnetic casing 12 runs freely on the shaft 1 on bearings at 13 and 14, and carries inside a permanent magnet 15, the poles of which embrace the ends of the armature 5. The casing 12 is coupled to the plate 2 by means of a dog clutch comprising two diametrical slots 16 into which two corresponding tongues 17 project from the plate 2, as shown in Fig. 2. The clutch should be so dimensioned that a small relative movement of the parts 2 and 12 is permitted, for example 6 or 8 degrees. Three or four leaf springs such as 18 are fixed in the corners of the slots and tongues for a purpose to be explained later. Only one such leaf spring is shown in each corner in Fig. 2 in the interests of clearness.

The TV unit is mounted on the end of the shaft to be tested by means of the coupling plate 2 so that it is coaxial therewith. The machine or engine driving the shaft is then started, and run up to the speed at which the test is to be made. The dog clutch will thereupon drive the casing 12 with the magnet, but when the engine speed has become constant the inertia of the casing 12 will maintain practically constant its angular velocity, and the dog clutch becomes free and ceases to operate as a driving member. The shaft 1 and casing 12 will rotate substantially like a solid body.

It was stated above that the casing 12 runs freely on the bearings. By this it is to be understood that when the TV unit is rotating at the test speed, and within the 6 or 8 degrees permitted relative movement, the casing is subjected to no spring drive or constraint, the only force acting on it being a specially provided aperiodic damping force to which further reference will presently be made. For this reason the bearings 13 and 14 can conveniently be plain cylindrical bearings as shown; ball bearings could however be used if desired.

Torsional vibrations of the shaft under test will cause the shaft 1 with the armature 5 to oscillate relatively to the casing 12 and magnet 15, the angular velocity of which will remain substantially constant as already explained. Electromotive forces will be generated in the coil 6 proportional to the vibrational angular velocity of the armature 5 relative to the magnet 15, which will be substantially the same as the torsional angular velocity of the shaft to which the TV unit is coupled. These electromotive forces are made available at the terminals 10 and 11 through the slip rings 7 and 8 as already explained.

The torsional vibrations will produce slight relative motion between the casing 12 and the shaft 1 at 13 and 14. The fit between the casing and the shaft at these points should accordingly be very good, with the minimum of clearance to allow free running without shake. The surfaces in contact should be suitably lubricated for smooth running, but as will be explained later, a certain amount of damping is necessary.

The leaf springs such as 18 (Fig. 2) provided in the dog clutch are for the purpose of preventing damage to the TV unit due to hammering at the clutch produced by violent irregular motion of the shaft which is likely to occur, for example, when starting up an internal combustion engine. The springs take up the impulses and prevent large shocks from being communicated to the casing 12. It is, however, essential that there should be from 6 to 8 degrees total free range between the springs so that the necessary normal range of vibration can be accommodated without being affected by the springs.

The casing 12 should be packed with a viscous medium such as oil or grease to provide a damping force, so that it is almost full. The grease will be forced to the circumference of the casing when the TV unit rotates, leaving a small clear space near the centre only. When there is no relative oscillation between the shaft and the casing, the grease fits closely against the tips of the armature 5 and prevents surges due to slow speed or non-recurrent vibrations; but when cyclically receiving vibrations take place the grease is displaced to form a track corresponding to the vibrations. Any change in amplitude is quickly followed by a corresponding change in the track length, so that an accurate record will be obtained after only a few vibrations.

This form of damping has the advantage that it makes the vibrating system of the TV unit aperiodic, and it prevents large surges due to irregular slow changes in the engine speed not associated with the relatively high frequency vibrations which are of interest.

Normally, light ball-bearing grease will be satisfactory for damping the TV unit in the manner explained; but heavier damping may be necessary in some cases, so a thicker grease should then be used. Similarly, if it has to operate relatively hot, a high temperature grease should be employed.

The brush gear 9 runs on ball-bearings, and to prevent it from rotating, it should be attached by a light flexible cord to some fixed point.

The actual size and weight of the TV unit will depend upon the type of work it is to perform. A satisfactory model for average service may be about 2¾ inches in diameter across the casing 12 and may weigh about 3 pounds. For lighter high speed work, a smaller model, say 1⅞ inches in diameter and weighing possibly 1¼ pounds, will be satisfactory. It is clear that the instrument must not have inertia sufficient appreciably to load the shaft under test, otherwise in certain cases it may modify the phenomena which it is desired to observe. For this reason also, a flange coupling such as is shown in Figs. 1 and 2 may not be satisfactory for small shafts. In such cases a small diameter sleeve or muff coupling is preferable, provided, of course, with a dog clutch arrangement such as has been shown. Other suitable couplings for particular cases will be easily contrived by those skilled in the art. Any such couplings should of course be rigid. In cases where the shaft under test gets hot, the coupling should be provided with a suitable heat insulating disc or sleeve.

In the case of very light shafts, also, it may be desirable to support the brush gear in a suitable stirrup or the like, to prevent any risk of appreciable bending of the shaft. This will however, rarely be necessary.

Fig. 3 shows in block schematic form the arrangement of the auxiliary apparatus for recording the torsional vibrations. The shaft 21 which is to be tested is only partially shown, the machines mounted thereon, the bearings and other details being omitted. At one end is mounted the TV unit 22 of the type described above in connection with Figs. 1 and 2, and in the manner explained. The terminals 10 and 11 of the TV unit 22 are connected to the input of a selective filter 24 and thence to an amplifier 25 and to an oscillograph unit 26 containing a cathode ray tube 27. The unit 26 may comprise any suitable auxiliary circuit for operating the tube, and as this is well known it will not be further described. The amplifier 25 should preferably include an integrating circuit for a purpose to be presently explained, and the amplifier described in British patent specification No. 453,887 is particularly suitable. Means should also preferably be provided for switching out the integrating circuit when not required.

A contact maker 23 is shown coupled to another shaft 28 and is provided for synchronising the time base of the oscillograph 27. It should make one contact per revolution of the shaft 28 and the point at which the contact is made with reference to the position of the shaft should preferably be adjustable. The construction of a suitable contact maker is well known and does not require further description. The shaft 28 should be one which is coupled to the test shaft 21, preferably by gears or the like, and in many cases it will be found that the engine cam shaft is suitable, so that one contact per complete engine cycle will be made. However, other contact making rates may be required, in which case a special countershaft suitably geared to or otherwise driven from the test shaft may be provided for the contact maker.

The contacts of the contact maker 23 are shown in Fig. 3 connected to the amplifier 25 which is supposed to contain the time base for the oscillograph 27, and may be arranged to synchronize the time base by periodically short-circuiting the condenser of the corresponding saw-tooth oscillator. If preferred the time base circuit could be included instead in the oscillograph unit 26. Any other known synchronizing means can clearly be used, the unit 23 being adapted accordingly as necessary.

Fig. 4 shows a schematic circuit diagram of the selective filter 24. The input terminals are 31 and 32 and the output terminals are 33 and 34. Two mechanically coupled two-way switches 35 and 36 are provided to enable the filter to be switched in or out of the circuit. When the switches are in the position marked "Out," terminal 31 is connected directly to terminal 33, and when they are in the position "In" a resistance R is connected in series between terminals 31 and 33, and terminals 33 and 34 are shunted by an anti-resonant circuit consisting of a condenser C in parallel with an inductance L. C and L should be adjustable to enable the circuit to be tuned to any desired frequency which may be present in the torsional vibrations.

The resistance R should preferably be equal to the input impedance of the amplifier 25, which may be 100,000 ohms for example. When the anti-resonant circuit is tuned to one of the vibration frequencies, its impedance will be very high and it will accordingly cause very little transmission loss at that frequency. At other frequencies its impedance will be much lower and it will produce a correspondingly large loss, so that these other frequencies will be substantially eliminated from the output of the filter. In order that the tuned circuit may have a high selectivity it is desirable that the inductance L should have as low a resistance as possible, and further, the best value of L depends on the frequency, being lower for the higher frequencies. In general it is inconvenient to provide a continuously variable inductance to enable it to be adjusted for each frequency, and in practice it is found that a range of about four values gives satisfactory results. The condenser C should be substantially continuously variable and may conveniently be of the well known decade type. Thus to cover a range of vibrations from about 1,500 to about 60,000 per minute, for example, L may have four values, say about 0.1, 0.5, 2.5 and 10 henrys, and C may range from 0 to 10 microfarads in steps of 0.001 microfarad. A range switch of any suitable type may be used for changing the inductance value. A calibration chart may be prepared relating the condenser and inductance settings to the corresponding resonance frequency.

The operation of the apparatus according to the invention will now be briefly described with reference to Fig. 3.

Assume first of all that the filter in 24 and the integrating circuit in 25 are switched out. A record of the electromotive force generated by the TV unit 22 will be obtained on the oscillograph related to the cyclic position of the shaft. The electromotive force generated is proportional to the torsional angular velocity of the shaft 21. If however, it is desired to obtain a record of the angular deviation, the curve must be integrated, and this operation is performed by the integrating circuit which is provided in the amplifier 25, which should therefore be switched in.

Figs. 5 and 6 show two examples of curves for a particular shaft driven by a four-stroke internal combustion engine, taken with a TV unit according to the invention. These curves are angular deviation curves to different horizontal scales and cover nearly two revolutions of the shaft, or one cycle of operation of the engine. Fig. 5 is taken at 1500 R. P. M. with a ¾ load, and Fig. 6 at 590 R. P. M. with a light load. They clearly illustrate that vibrations with several different frequencies are simultaneously present, and that changes in the speed and load produce large changes in the vibrations of the shaft. Such curves as these are very difficult to interpret, and for this purpose the unit 24 is provided. The filter unit is switched in and by tuning successively to the various frequencies present, the various modes of vibration may be separately picked out and will appear on the oscillograph screen as substantially regular sine waves, whose amplitude and frequency may then be easily determined.

The deflections of the oscillograph beam may easily be calibrated in terms of the actual displacements of the TV unit by any simple mechanical arrangement by which known relative angular deflections of the shaft 1 and the casing 12 are produced. For example, the flange 2 (Fig. 1) may be attached to a base board, and a stiff radial arm may be clamped to the casing 12 and its movement may be confined between a pair of fixed limit stops allowing a known angular displacement. If the integrating circuit in amplifier 25 be switched in, and the time base be switched off, the length of the trace produced on the oscillograph screen by vibrating the arm between the stops gives the desired calibration.

Under certain circumstances, for example if the vibration frequencies are very low, the moment of inertia of the casing 12 may prove insufficient to obtain accurate results. In such cases, the casing may be loaded with an additional mass of high polar moment of inertia clamped on the outside. This should add the minimum mass to the shaft and accordingly it should preferably be in the form of a fly-wheel with a relatively heavy rim connected to a centre hub by a thin disc or by a few spokes.

The additional mass or fly-wheel should preferably be clamped to the casing by some kind of adjustable friction clamp or clutch so that it will slip when oscillations exceeding a certain amplitude and/or frequency are reached, so that a predetermined limiting torque acts on the fly-wheel. This is for the purpose of protecting the driving dogs of the clutch from excessive overloads which might occur owing to the increased moment of inertia.

As the necessity for the extra inertia only arises at low frequencies which will be associated in practice with low running speeds, the increase in mass of the TV unit will generally be of no consequence, but it should be kept as low as possible by proper design of the extra mass as explained above.

The TV unit should preferably be directly coupled to the shaft to be tested, but this may not always be possible. In such cases it may be attached to an auxiliary shaft geared to the test shaft by well cut gears, or driven by means of a light belt of high longitudinal elasticity such as a steel belt. For this purpose it is essential that the TV unit and the driving pulley should be as light a possible, and a TV unit such as the smaller one referred to above, with a muff coupling, should be used.

What is claimed is:

1. Apparatus for detecting torsional vibrations of a rotating member comprising an electro-mechanical generator adapted to be coupled to the rotating member under test, said generator comprising a shaft, a cylindrical mass supported by the shaft and rotatably secured thereto to be rotatable with relation to the shaft with a small angle of angularity deflection, means for creating a magnetic field comprising a pole piece carried by the mass, and armature coils carried by the shaft in coupled relation therewith to be effective upon relative angular oscillations of the mass and shaft for generating in the coil electromotive forces corresponding to the oscillations, and said coupling connection between the shaft and the rotatable mass includes a key projection on one of said shaft and mass received within an elongated recess in the other of said shaft and mass and each of said shaft and mass carrying leaf springs interposed between the engaging surfaces of said key and recess and spaced to permit a limited normally free movement of the shaft relative to the mass.

2. Apparatus for detecting torsional vibrations of a rotating member comprising an electro-mechanical generator adapted to be coupled to the rotating member under test, said generator comprising a shaft, a cylindrical mass supported by the shaft and rotatably secured thereto to be rotatable with relation to the shaft with a small angle of angularity deflection, means for creating a magnetic field comprising a pole piece carried by the mass, and armature coils carried by the shaft in coupled relation therewith to be effective upon relative angular oscillations of the mass and shaft for generating in the coil electro-motive forces corresponding to the oscillations, and said coupling connection between the shaft and the rotatable mass including resilient contact members spaced to permit a normally free movement of the shaft and the mass, a pair of insulated slip rings coaxially fixed to the shaft of the generator, and brushes and output terminals associated therewith, the armature coil being connected to the slip rings by wires passing through the center of the shaft.

3. In an apparatus for detecting torsional vibrations of a rotating member, a shaft adapted to be driven by said member, an armature with a coil rigidly attached to said shaft, magnetizing means supported by the shaft and rotatable relative thereto, a viscous coupling between armature and magnetizing means to produce a relative displacement therebetween depending upon the amplitude of the vibrations, and an elastic coupling between shaft and magnetizing means, said coupling being effective when said displacement exceeds a predetermined fraction of a rotation.

4. An apparatus according to claim 3 comprising slip ring means rigidly attached to the shaft, contact means engaging said slip ring means and a terminal member carrying said contact means and supported by the shaft so as to rotate freely relative thereto.

5. An apparatus according to claim 3 comprising slip ring means rigidly attached to the shaft, contact means engaging said slip ring means, and a terminal member carrying said contact means supported by the shaft on ball bearings so as to rotate freely relative to the shaft.

6. An apparatus according to claim 3 comprising slip rings rigidly attached to the shaft coaxially therewith, contact brushes engaging the slip rings, and springs pressing the brushes against the rings.

7. An apparatus according to claim 3 comprising a disc rigidly attached to one end of said shaft to be driven by the rotating member, and a terminal member supported by the other end of the shaft so as to rotate freely relative thereto, said terminal member including terminal contacts and brushes to pick up the induction produced in the coil of the armature.

8. An apparatus according to claim 3 wherein the magnetizing means comprise a hollow non-magnetic cylindrical housing supported by the shaft and coaxially rotatable relative thereto, said housing supporting on its inner side magnetic pole pieces arranged diametrically at a small distance from the armature, said armature comprising pole pieces diametrically arranged, each of said armature pole pieces carrying a coil arranged perpendicular to the axis of rotation of the armature, the hollow space between armature and magnetizing means being filled with a viscous liquid at least to its greater part.

9. An apparatus according to claim 3 wherein the hollow space between armature and magnetizing means is filled with a liquid of sufficient viscosity to drive the magnetizing means through the armature and, when vibrations occur, to permit a relative displacement between armature and magnetizing means, said displacement substantially depending upon the average amplitude of said vibrations.

10. An apparatus according to claim 3 comprising a pair of insulated slip rings rigidly attached to the shaft coaxially therewith, said shaft having a hollow portion, and wiring means for connecting the coil of the armature to the slip rings through the hollow portion of the shaft.

11. An apparatus according to claim 3 comprising a terminal member supported by the shaft to rotate freely relative thereto, means for connecting the armature coil to said terminal member, measuring means mechanically separated from the shaft including an amplifier electrically connected to the terminal member for amplifying the impulses induced in the coil, a cathode ray oscillograph for recording the amplified impulses, an impulse generator coupled to the rotating member for producing a time base for the oscillograph, and an adjustable selective filter arranged in circuit between terminal member and amplifier to isolate torsional vibrations of different frequency ranges.

12. An apparatus for detecting torsional vibrations of a rotating member, comprising an electromechanical generator adapted to be coupled to the rotating member under test, said generator comprising a shaft, a cylindrical mass supported by the shaft and rotatably secured thereto to to be rotatable with relation to the shaft with a small angle of angularity deflection, means for creating a magnetic field comprising a pole piece carried by the mass and armature coils carried by the shaft in coupled relation therewith to be effective upon relative angular oscillations of the mass and shaft for generating in the coil electromotive forces corresponding to the oscillations and said coupling connection between the shaft and the rotatable mass, consisting of a key projection on one member received within an elongated recess in the other member and each of the members carrying leaf springs interposed between the engaging surfaces and spaced to permit a limited normally free movement of the shaft relative to the mass.

RICHARD STANSFIELD.